A. E. Young,

Knob Attachment.

Nº 13,473. Patented Aug. 21, 1855.

UNITED STATES PATENT OFFICE.

ALONZO E. YOUNG, OF DORCHESTER, MASSACHUSETTS, ASSIGNOR TO HIMSELF AND M. WORTHLEY.

DOOR-KNOB.

Specification of Letters Patent No. 13,473, dated August 21, 1855.

*To all whom it may concern:*

Be it known that I, ALONZO E. YOUNG, of Dorchester, in the county of Norfolk and State of Massachusetts, have invented a new and useful Mode of Connecting Two Door or Lock Knobs; and I do hereby declare that the same is fully described and represented in the following specification and the accompanying drawings, letters, figures, and references thereof.

Figure 1:
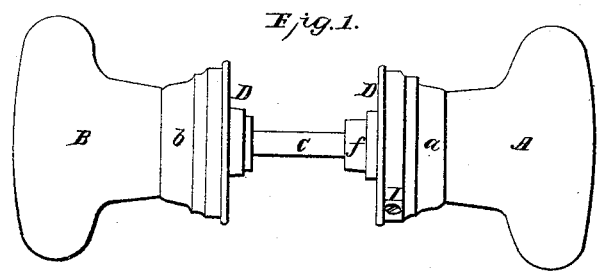
Figure 2:
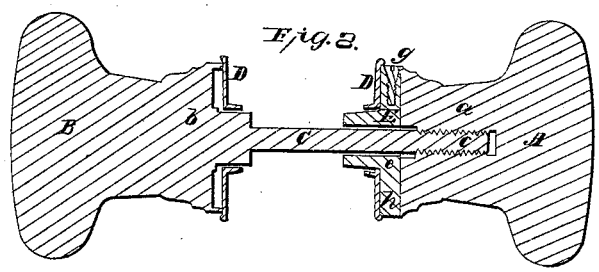
Figure 3:
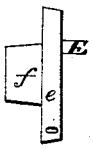

Of the said drawings Figure 1 denotes a side elevation of two knobs connected in accordance with my invention. Fig. 2 is a longitudinal section of the same; Fig. 3 is a side view of their sliding clutch to be hereinafter described.

The object I have had in view while making my invention has been to so combine one knob with the shank of the other, that not only may the two knobs be adjusted at different distances asunder whereby they may be readily adapted to a door of any ordinary thickness, but may be fastened on or connected to the shank that when either is turned by the hand of a person applied to it, it will cause the shank to be rotated with it.

In the drawings, A and B represent the two knobs, one of them, viz, B, being firmly fastened to the shank C so as to be immovable with respect to the same. Between these knobs are two collar plates D D, which are to be screwed to the door and serve as washers or bearings to prevent wear of it by the sockets $a$ $b$ of the knobs. The shank C is to be provided with a male screw $c$, which is to be made to enter or screw into a corresponding female screw formed in the knob A or its socket $a$.

On the shank C there is placed what I term a sliding clutch E, which consists of a disk or wheel $e$, united to one end of a cylindrical hub $f$, which should be so applied to the shank as not only to be capable of sliding freely on it in a longitudinal direction, but of not being rotated on it or independently of it. In adapting the clutch to the shank I usually make the passage through it for the reception of the shank to correspond in section with that of the shank, it being supposed that such shank is either triangular, quadrangular or polygonal in section. The disk $e$ enters a circular recess $h$ formed in the socket $a$ of the knob A and is confined to the socket or knob by means of one or more screws $g$ extended through the socket and into the disk at its periphery. I commonly make use of three of these screws (although I by no means confine myself to such number) arranging them at equal distances asunder, in order that at every rotary movement of the knob through an arc of one hundred and twenty degrees and with respect to the clutch, the former may be in position to be fastened to the latter.

By means of the male and female screws above described the distance between the two knobs may be adjusted or varied, while by the clutch and its screws or means of attaching it to its socket $a$ the knob A may be so applied to the shank as to cause the two to be simultaneously rotated whenever the knob is grasped and turned by the hand of a person.

What I claim is—

The sliding clutch and its attachments, applied to the shank and the socket of the movable knob, the whole being substantially as specified.

In testimony whereof I have hereunto set my signature, this twelfth day of June, 1855.

ALONZO E. YOUNG.

Witnesses:
  R. H. EDDY,
  F. P. HALE, Jr.